Figure 1:
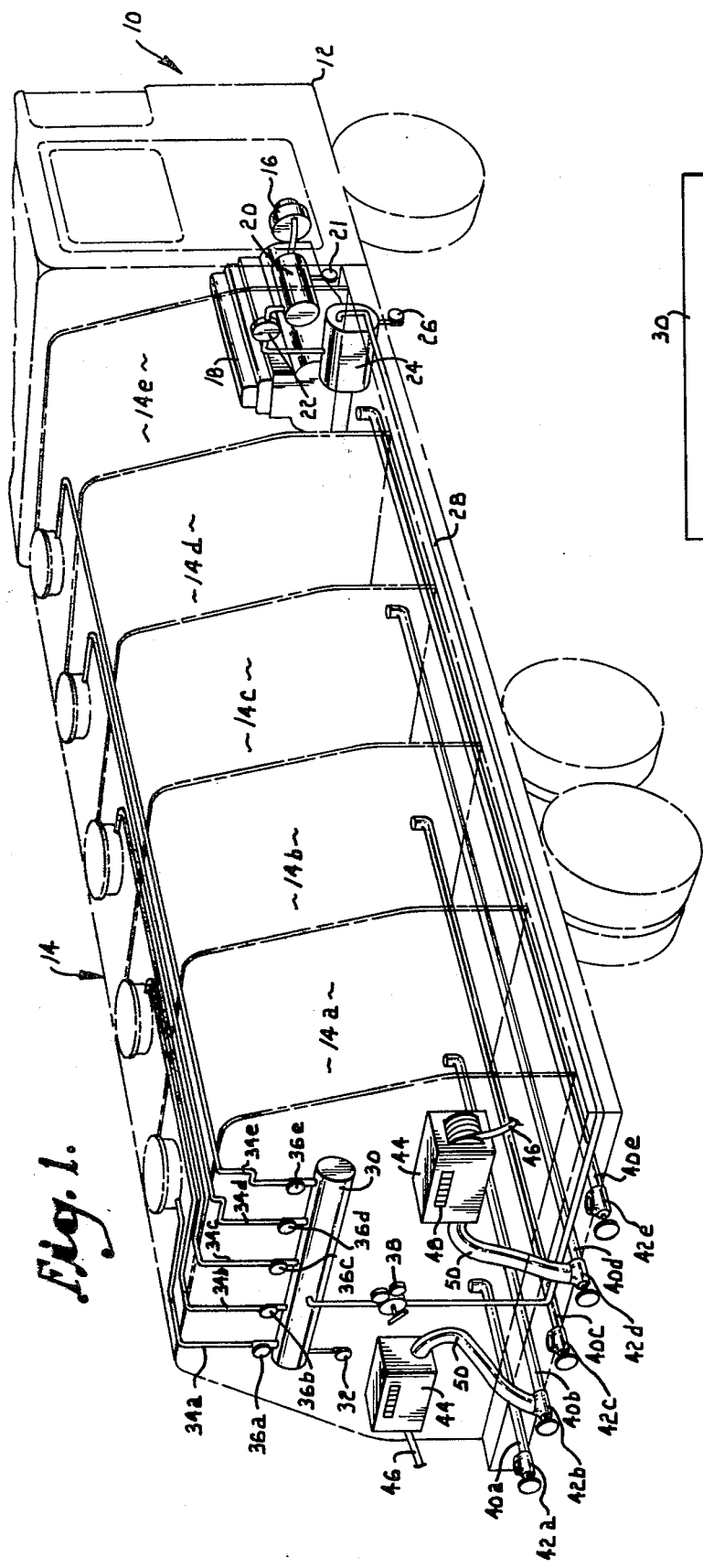

United States Patent [19]

Rogers

[11] 4,131,214

[45] Dec. 26, 1978

[54] METHOD AND APPARATUS FOR EMPTYING THE CONTENTS OF A TANK CARRIED BY AN ENGINE-POWERED VEHICLE

[76] Inventor: Joe E. Rogers, Box 456, Waverly, Kans. 66871

[21] Appl. No.: 761,586

[22] Filed: Jan. 24, 1977

[51] Int. Cl.² .............................................. B67D 5/54
[52] U.S. Cl. ........................................ 222/1; 222/136; 222/396; 222/399; 222/608; 280/5 D
[58] Field of Search ................... 222/608, 626, 1, 136, 222/396, 399; 280/5 C, 5 D; 239/172

[56] References Cited

U.S. PATENT DOCUMENTS

| | | | |
|---|---|---|---|
| 1,892,519 | 12/1932 | Schottgen | 222/626 X |
| 2,498,229 | 2/1950 | Adler | 222/626 X |
| 3,219,275 | 11/1965 | Green | 239/373 X |
| 3,712,514 | 1/1973 | LeBlanc | 222/626 X |

Primary Examiner—Allen N. Knowles
Assistant Examiner—Frederick R. Handren
Attorney, Agent, or Firm—Lowe, Kokjer, Kircher, Wharton & Bowman

[57] ABSTRACT

Apparatus for pumping a flowable material from a tank disposed on an engine-powered vehicle is the subject of the present invention. The invention is particularly adapted for use with a multiple compartment tank on a petroleum delivery truck. An air pump, which may be the air pump for operating the air brakes of the vehicle, is powered by the vehicle engine and pumps air into a surge tank where the air is held under pressure. A conduit leads from the surge tank to a manifold that is coupled with each of the compartments of the material storage tank. Each of the compartments is coupled with the common manifold through appropriate spur conduits. Appropriate pressure regulator means maintains the pressure on the surge tank and valve means is operable to pass the air under pressure from the surge tank to one or more of the compartments thereby pumping the material from the storage tank.

6 Claims, 2 Drawing Figures

U.S. Patent  Dec. 26, 1978  4,131,214

METHOD AND APPARATUS FOR EMPTYING THE CONTENTS OF A TANK CARRIED BY AN ENGINE-POWERED VEHICLE

This invention relates to tank trucks generally and, more particularly, to a method and apparatus for emptying the contents of the tank truck.

A common mode for transferring flowable materials is overland via trucks equipped with tanks. In many cases such as where various types of petroleum are being carried the tank truck has multiple compartments to handle different types of petroleum. One popular form of tank truck is the tank "wagon" which is used by distributors to deliver gasoline, fuel oil, diesel, and other petroleum products to bulk users.

The typical tank wagon is equipped with at least one and oftentimes two mechanical pumps to pump the products from the tank. The pumps are powered by the power take off from the truck's engine. It is necessary in most instances to have two of the pumps on the tank wagon since gasoline and diesel may not be passed through the same pump.

The mechanical pumps which are typically used with tank wagons are relatively expensive and also add measurably to the total weight of the truck, thereby decreasing the truck's own fuel economy. Although any danger is minimal, there is also always a problem of possible fire with any type of mechanical pump used to move petroleum products due to friction.

It is, therefore, a primary object of the present invention to provide a method and apparatus for emptying the contents of a flowable material contained in a tank on an engine-powered vehicle wherein the air pump used to operate the power brakes of the vehicle may also be used to pump the material from the tank, thereby reducing the weight of the pumping equipment resulting in increased fuel economy for the vehicle.

As a corollary to the above object, an important aim of the invention is to reduce the cost of auxiliary pumping equipment by eliminating mechanical pumps operating from the power take off of the vehicle and instead utilizing the air pump for the vehicle brakes.

It is also an objective of this invention to reduce the amount of conduits required to transfer material from the tank by eliminating the need for conduits to travel from the tank to a pump and back to the outlet from the tank and instead having only conduits running from the air pump surge tank to the material carrying tanks.

Another object of this invention is to provide for greater fuel economy in tank wagon vehicles by eliminating the need for mechanical pumps operated by the engine in order to pump liquids from the tanks. Instead, air pressure which is built up during normal operation of the engine is utilized in most instances thus not requiring the engine to be operating while the tanks are being emptied.

As a corollary to the object next preceding, an aim of the invention is to increase fire safety around tank wagons by providing for a method and apparatus for emptying the contents of a tank wagon without the need for the engine or any mechanical pump to be operating while fuel is being emptied from the tanks.

Still another objective of the invention is to provide for increased cost savings on tank trucks by providing a single pumping apparatus which may be utilized for both gasoline and diesel fuel products as well as any other petroleum products which are carried by the truck.

An important aim of the invention is to provide a method and apparatus for delivering two or more products from a tank truck simultaneously, thereby reducing by at least one-half the amount of time required to deliver two products at a single location as opposed to previous tank trucks which were not equipped to deliver two products simultaneously.

Figure 2:
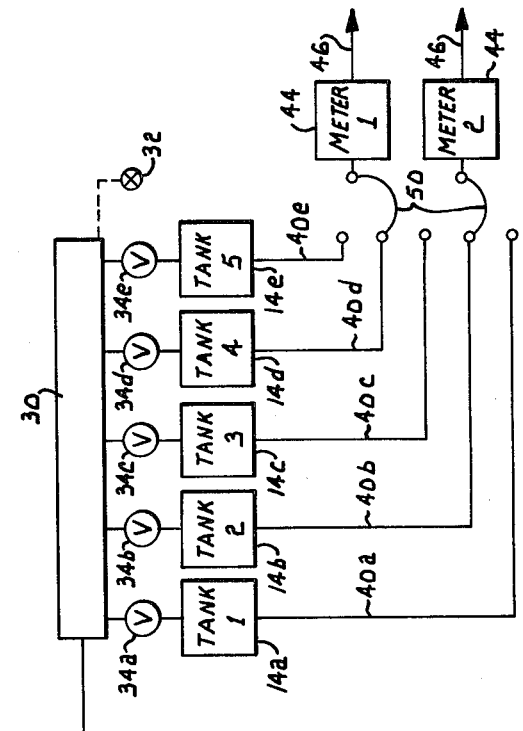
Figure 2:
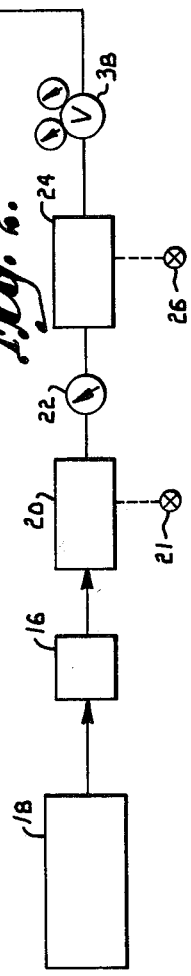

Other objects of the invention will be made clear or become apparent from the following description and claims when read in light of the accompanying drawing, wherein:

FIG. 1 is a partially schematic perspective view of a multiple compartment tank truck wagon utilizing the apparatus of the present invention; and FIG. 2 is a diagrammatic representation of the apparatus of the present invention.

Referring initially to FIG. 1, a tank truck wagon is designated generally by the numeral 10 and comprises an engine-powered vehicle 12, the chassis of which is outfitted with a five compartment tank 14. The individual compartments of tank 14 are designated by reference numerals 14a–14e.

Vehicle 12 is provided with air brakes (not shown) which are operated by an air pump 16 that is driven by the engine 18. Pump 16 delivers air to a first surge tank 20 from which air is delivered through appropriate conduits to the air brakes on the individual wheels of the vehicle. Bleed valve 21 on tank 20 provides means for emptying any water accumulating in the tank.

A pressure regulator 22 assures adequate operating pressure in tank 20 for the air brakes and when this pressure is reached additional air entering tank 20 is passed to a second surge tank 24. A valve 26 in the bottom of tank 24 is provided to drain off any accumulating moisture. Tank 24 is of somewhat larger capacity than tank 20 and is designed to hold adequate air under pressure to empty the contents from one or more of compartments 14a–14e. The tank 24 is coupled with each of the compartments through a conduit 28 that runs from the tank along the length of the truck to a manifold tank 30. Manifold tank 30 is also provided with a drain valve 32 to drain off any moisture collecting in the tank. Extending from manifold 30 are conduits 34a–34e inclusive which communicate with tanks 14a–14e, respectively, at the uppermost part of the tank. Each of conduits 34a–34e is also provided with a flow control valve 36a–36e. A two gauge pressure regulator 38 is provided in line 28 immediately below manifold 30. This regulator may be preset to maintain a desired pressure in the manifold and also monitor the actual operating pressure.

Each of compartments 14a–14e is provided with a drain conduit 40a–40e which extends from the bottom of the compartment to a location at the rear of tank 14. Each of the conduits 40a–40e is provided with a flow control valve 42a–42e.

Mounted at the rear of tank 14 are two meter boxes 44. Each box 44 contains a delivery hose 46 which is reel mounted as well as a display meter 48 to visibly indicate the amount of fuel passing through the meter. A conduit 50 with a quick disconnect coupling at one end may be easily moved from a corresponding coupling above each of valves 42a–42e.

In operation, tank wagon 10 normally has compartments 14a–14e filled with different types of petroleum products such as regular, ethyl and lead-free gasoline plus diesel fuel and fuel oil. As the vehicle 12 travels over the road, air pump 16 is operated from the engine to build up a supply of pressurized air in surge tank 20. This air operates the air brakes for the vehicle as is well known to those skilled in the art. Regulator 22 assures that adequate pressure is maintained within tank 20 and so long as the minimum pressure to operate the brakes is present additional air emanating from pump 16 will be passed to surge tank 24. Here air is accumulated under pressure in accordance with the preset reading of regulator 38. It is to be understood that high pressure pop off valves are located at the top of each of tanks 14a–14e. These valves assure that the pressure inside each tank compartment will not exceed a safe level. The preset reading of regulator 38 is, manifestly, below the activating pressure of the safety pop off valves. When the tank truck reaches its destination, the engine may be shut off and the driver moves to the rear of the vehicle where conduit 50 is coupled with the appropriate valve 42b for the compartment from which it is desired to pump fuel. The appropriate valve such as 36b is opened together with the corresponding valve such as 42b. This allows air from surge tank 24 to enter the compartment 14b above the level of the liquid thereby forcing the liquid out through conduit 40b. The fuel is forced through meter 44 and into delivery conduit 46. Enough air pressure is present in the system to fill most farm and residential tanks. If additional pressure beyond the storage capacity of the system is needed, engine 18 may be operated to keep pressure up.

Manifestly, fuel may be delivered from any of the compartments 14a–14e in the manner described by coupling conduit 50 with the appropriate outlet from one of valves 42a–42e and opening the valve as well as the corresponding valve 36a–36e. It will be appreciated that two liquids may be delivered from two compartments simultaneously by operating both of the delivery conduits 46 at the same time. The delivery operation is quicker as a result of this simultaneous delivery and is also much safer by virtue of the fact that the engine 18 is not operating and there is no mechanical pump needed to pump the fuel. It is to be understood, of course, that the delivery system of the present invention in no way interferes with gravity delivery which may be utilized for below ground tanks.

Having thus described my invention, I claim:

1. In an engine-powered vehicle for carrying a petroleum product in a tank carried by the vehicle and wherein the vehicle is equipped with an air pump adapted to be operated by the engine of the vehicle, a first surge tank coupled with said air pump for accumulating air under pressure and air brakes that are operated by the pressurized air accumulated in said first surge tank, the combination therewith of an apparatus for pumping said petroleum product from said tank while the engine of said vehicle is not operating, said apparatus comprising:
   a second surge tank for accumulating air under pressure;
   regulating means for directing air from said air pump to said second surge tank whenever the pressure of the air within said first surge tank is above a preset value, said preset value being above the minimum pressure needed to operate said air brakes;
   means for coupling said second surge tank with said tank for carrying the petroleum product; and
   valve means for controlling the flow of air from said second surge tank to the tank containing said petroleum product whereby the latter may be forced from its tank by the air from the second surge tank.

2. The invention of claim 1, wherein the tank for carrying a petroleum product comprises a multiple compartment tank and said coupling means comprises conduit means extending to each of said compartments.

3. The invention of claim 2, wherein said coupling means comprises a manifold common to all of said compartments and disposed between said conduit means and said second surge tank.

4. The invention of claim 3, wherein is included regulator means coupled with said second surge tank for controlling the pressure of the air on said compartments.

5. A method of emptying a petroleum product contained within a tank, said tank having a selectively operable control valve to permit egress of the petroleum product, said tank further being carried by an engine-powered vehicle when the vehicle is equipped with an air pump, adapted to be operated by the engine of the vehicle, a first surge tank coupled with said air pump for accumulating air under pressure, and air brakes that are operated by the pressurized air accumulated within said first surge tank, said method comprising the steps of:
   accumulating within said first surge tank air from said air pump to provide a first source of air under pressure said first source of air under pressure being used to operate said air brakes;
   accumulating within a second surge tank air from said air pump whenever the pressure of the air within said first surge tank is above a preset value to thereby provide a second source of air under pressure, said preset value being above the minimum pressure needed to operate said air brakes;
   directing air from said second source of air under pressure to a point within said tank above the level of said petroleum product to thereby force said petroleum product from the tank when said control valve is open; and
   turning off the engine of the vehicle whenever air from said second source of air under pressure is being directed to said tank.

6. A method as set forth in claim 5, wherein said tank is a multiple compartment tank and wherein said step of directing air comprises directing air to a plurality of said compartments at the same time to thereby simultaneously empty said compartments.

* * * * *